Nov. 15, 1966 — B. LYMAN — 3,285,608

PNEUMATIC SHEET DETECTING CONTROL MEANS

Filed Oct. 5, 1964

INVENTOR.
BROOKS LYMAN
BY Albert W. Scribner

United States Patent Office 3,285,608
Patented Nov. 15, 1966

3,285,608
PNEUMATIC SHEET DETECTING CONTROL MEANS
Brooks Lyman, Pound Ridge, N.Y., assignor to Pitney-Bowes, Inc., Stamford, Conn., a corporation of Delaware
Filed Oct. 5, 1964, Ser. No. 401,420
7 Claims. (Cl. 271—74)

This invention relates to an improved aerodynamic type of control means. More specifically the instant invention relates to a novel control arrangement for triggering the operation of a fluid control device such as a valve or a fluid amplifier.

When attempting to encorporate fluid amplifiers and/or valves in pneumatic control circuits difficulty has been encountered in obtaining a simple, inexpensive and reliable triggering means for causing the fluid control device to shift its mode of operation. Various proposals for obtaining this shifting action have been made; for example the use of electrical, electrostatic or magnetic types of transducers has been suggested, however such proposals have not always afforded satisfactory results. Applicant has devised a very effective and simple aerodynamic type control circuit which is consistent with the air medium of such fluid control devices and which involves no moving parts except for the air itself.

One object of the instant invention is to provide an improved control circuit for a fluid control device whereby a very sensitive and fast control of the operation of the fluid device can be obtained.

Another object of the invention is to provide a novel aerodynamic type of triggering means for fluid control devices whereby a very reliable and positive mode shifting operation of a fluid device may be obtained.

A further object of the invention is to provide a novel aerodynamic means for sensing the presence or absence of a sheet of material that is moved along a predetermined feed path.

Other objects of the invention will become apparent as the disclosure progresses.

The instant control circuit is shown and will be described as being arranged in combination with a sheet transport device; however it is to be understood that said circuit may be used in many different types of control environments.

Figure 1:
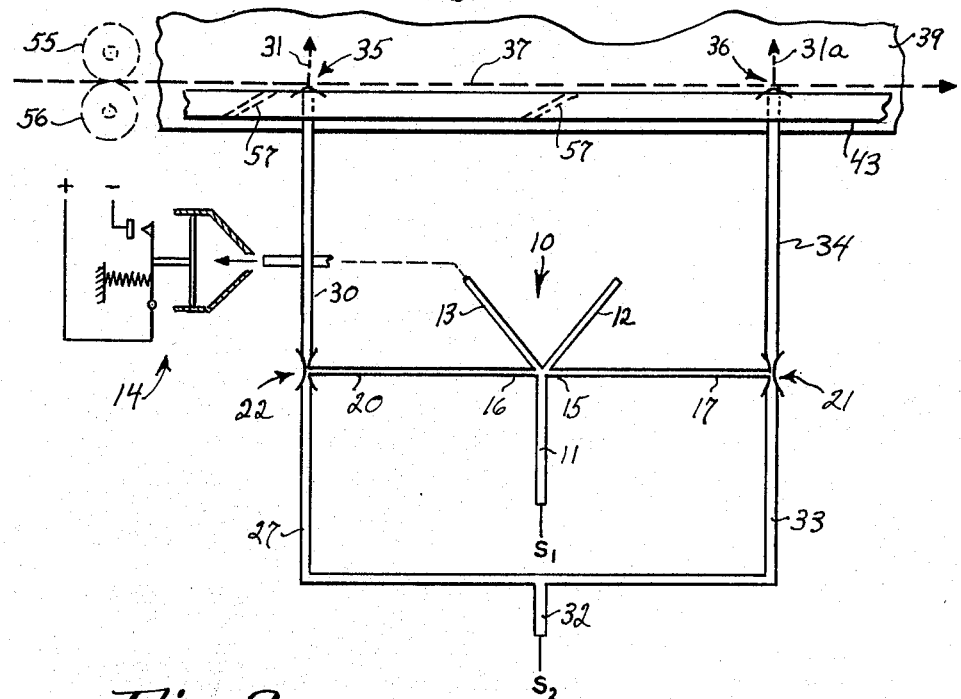
FIG. 1 is a plan view of the instant pneumatic control circuit as applied to a sheet transport device.
Figure 2:
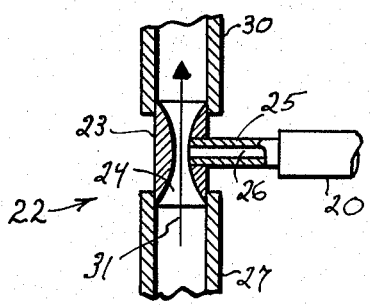
FIG. 2 is an axial sectional view illustrating the structural natural of the aspirating means used in connection with the circuit shown in FIG. 1.
Figure 3:
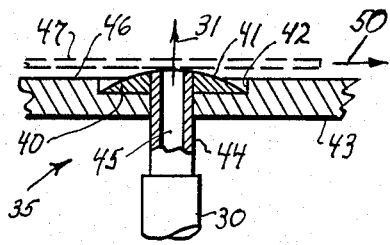
FIG. 3 is an axial sectional view illustrating the construction of the terminal portion of the conduit means for the sheet sensing air stream.

Referring to FIGS. 1-3 there is shown a fluid control device in the form of a conventional type fluid amplifier 10 having a main air supply line 11 that is adapted to be connected so as to receive air from a suitable pressure source $S_1$, and a pair of output lines 12 and 13 which are operatively coupled to the device that is to be controlled or operated by the instant control circuit. In this case the output line 13 is pneumatically coupled to a transducer 14 that may be connected to control the operation of any desired portion of the associated apparatus. The fluid amplifier 10 also has two control lines 15 and 16 which are respectively connected by means of air conduit lines 17 and 20 to two separate aspirating means 21 and 22. In that the two aspirating means and the respective connection thereto are similar, a detailed discussion of one such means (22) will suffice here. Referring to FIG. 2 the aspiring means 22 comprises a venturi member 23 having a constricted axial passage 24 formed therethrough. A tubular fitting 25 is mounted in a suitable aperture formed in the venturi member so that the axial passage 26 of said fitting pneumatically communicates with the throat portion of said constricted passage 24. The tubular fitting 25 is pneumatically connected to said air conduit line 20. The axial ends of venturi member 23 are pneumatically connected to air conduit lines 27 and 30 so that a sensing air stream 31 may be conducted to and through the venturi member; the conduit line 27 being pneumatically connected by means of a line 32 to an air pressure source $S_2$. As will be apparent when the sensing air stream 31 is established through the venturi member the pressure existing in the air conduit line 20 and the control line 16 of the fluid amplifier will be lowered. Thereafter when there is an interference with or a partial blockage of said air stream 31 the pressure in the passage 26 will immediately increase by a substantial amount thereby increasing the air pressure in the control line 16 to an extent such that the operational mode of the fluid amplifier 10 may be changed; i.e. changed to an operational state where output line 12 is conducting rather than output line 13. The above noted pressure change in the control line 16 resulting from an interference with the air stream 31 produces a very positive mode shifting action for the fluid amplifier. Here the pressure in control line 16 is normally negative but when the air stream 31 is partially blocked the pressure in control line 16 will become positive in that part of the air stream 31 will now be diverted into the air conduit line 20. Thus with a positive pressure in control line 16 and a negative pressure remaining in control line 15 a heavy shift producing bias is thereby applied to the fluid amplifier and such will immediately and reliably change the operational mode of the amplifier. The construction, connections and operation of the aspirating means 21 and the associated air lines 17, 33 and 34 correspond respectively to that just described for the aspirating means 22 and associated air lines 20, 27, and 30.

When the sensing air streams 31, 31a, FIG. 1, are respectively flowing through the aspirating means 22 and 21 the fluid amplifier will have balanced control pressures (usually negative or sub-atmospheric pressures) existing in the control lines 17 and 20 thereof, and thus the fluid amplifier will remain in its then existing mode of operation until caused to shift from said operational mode as will be discussed below.

The outer ends of the respective air conduit lines 30 and 34 of the instant control circuit are arranged so as to be operated on or affected by the variable condition or conditions to be sensed. In this particular case the ends of said lines 30, 34 are operatively coupled to a sheet feeding track by sensing means 35 and 36 so that the latter may respectively sense at two given locations along said track the presence or absence of a sheet that is moving along a given sheet feed path 37, FIG. 1. Here again in that the construction and arrangement for the sensing means 35 and 36 are similar, a discussion of only one such sensing means (35) will suffice here. Referring to FIG. 3 the sensing means 35 comprises a circular button 40 which has a spherical type outer surface 41 and which is secured in a shallow circular recess 42 formed in a track or sheet guide member 43. The button member 40 is formed with a central opening which is aligned with a corresponding opening in the guide member 43; said openings being adapted to receive and secure a tubular fitting 44 that has an axial passage 45 formed therethrough. The inner end of fitting 44 is connected to said air conduit line 30 while the other end thereof is disposed so as to be substantially flush with the immediately surrounding portions of the spherical surface 41, which surface is located slightly beyond the plane of the adjacent portions of the face 46 of the track 43. As will be apparent when there is no interference or partial blockage of the sensing air stream 31, FIG. 3, the operational mode of the fluid amplifier will remain unchanged. When however a sheet such as 47, FIG. 3, moves endwise as indicated by arrow 50 along the feed path and partially covers the end of tube passage 45 the sensing air stream 31 will then experience an interference and the pressure in the control line 16 will immediately increase thereby making possible a shift in the operational mode of the fluid amplifier as above described. The construction, connections and operations of the sensing means 36 correspond to that just described for sensing means 35.

When both of said sensing means 35 and 36 are operating to direct sensing air streams 31 and 31a, FIG. 1, across the sheet feed path 37 and no sheet is moving along said path the fluid amplifier 10 will remain in its then existing mode of operation which will be assumed to be the mode where output line 13 is conducting. When a sheet is transported along the feed path 37 from left to right as seen in FIG. 1 and initially encounters the sensing air stream 31 the fluid amplifier will be shifted to its other mode of operation wherein output line 12 is conducting and the fluid amplifier will remain in this shifted operational mode even after the trailing end of the sheet has moved past the sensing means 35. This change in output of the fluid amplifier and the resultant output signal of the transducer 14 may be utilized to operate and/or control any desired portion of the apparatus associated with the instant control circuit. When the sheet moves further to the right and encounters the second sensing air stream 31a (it is assumed that the length of the sheet here is less than the distance between the sensing air streams 31, 31a) the fluid amplifier will be thereby shifted back to its initial mode of operation wherein output line 13 is again conducting. The fluid amplifier will remain in this initial operational mode until a subsequent disturbance of the air stream 31 takes place. In this manner the fluid amplifier 10 is set and reset during the feeding movement of each sheet. The sensing of the presence of sheets by the sensing air streams 31, 31a is most efficient here in that it is not critical that a sheet be in actual contact with the surface 41 of the button member 40.

The means for transporting the sheets along the feed path 37 may comprise any suitable mechanical drive arrangement for example that illustrated by the set of drive feed rolls 55, 56, FIG. 1; or may preferably comprise a plurality of air jet apertures such as 57, FIG. 1, formed in track 43 whereby a plurality of air jets may be established to aerodynamically propel said sheets along said feed path 37 in a manner generally similar to that discussed in U.S. Patent No. 3,136,539.

As mentioned above the instant pneumatic control circuit for the fluid amplifier 10 may be used in connection with many different arrangements other than sheet feeding devices. Several control circuits of the type above described have been constructed and used under varying conditions and in each case the performance obtained has been particularly sensitive, reliable and fast.

Since many changes could be made in the embodiment of the invention as particularly described and shown herein without departing from the scope of the invention, it is intended that this embodiment be considered as exemplary and that the invention not be limited except as warranted by the following claims.

What is claimed is:
1. A sheet handling device: comprising
   transport means for propelling a sheet along a predetermined feed path, said transport means including a plurality of air jets which are capable of frictionally propelling sheets along said feed path;
   a sheet sensing device;
   a first air conduit means for directing a sensing stream of air across said feed path, the end of said first air conduit means being positioned in operative relation with respect to said predetermined feed path;
   aspirating means operatively disposed in said air conduit means;
   a fluid control device adapted to be coupled to an air pressure source and having at least one control line; and
   a second air conduit means operatively connected between said aspirating means and said control line whereby an interference with said sensing stream of air produces a pressure change in said control line thereby causing said fluid device to change its mode of operation.

2. In a sheet handling device:
   means for transporting sheets along a predetermined feed path;
   a first air conduit means for directing a sensing stream of air across said feed path;
   an air aspirating means operatively disposed in said conduit means;
   a second air conduit means operatively coupled to said aspirating means;
   a fluid control device adapted to be coupled to an air pressure source and having a pair of control lines, one of said control lines being coupled to said second air conduit means;
   a third air conduit means for directing a second sensing stream air across said feed path;
   a second aspirating means operatively disposed in said third air conduit means; and
   a fourth air conduit means operatively coupled between the other one of said control lines and said second aspirating means whereby an interference with either of said sensing streams of air can cause said fluid control device to alter its mode of operation.

3. Apparatus as defined by claim 2 wherein the respective terminal portions of said first and third air conduit means are adapted to be temporarily partially covered by a sheet that is moving along said feed path.

4. Apparatus as defined by claim 2 wherein the sheet transporting means includes a plurality of air jets which are capable of frictionally propelling sheets along said feed path.

5. In a sheet handling device;
   means for transporting a sheet along a predetermined sheet feed path;
   a fluid amplifier adapted to be coupled to an air pressure source and having a pair of output lines and a pair of control lines;
   a first aerodynamic sheet sensing means adapted to direct a jet of air across said feed path;
   means for coupling said first aerodynamic sheet sensing means to one of said control lines of said fluid amplifier;
   a second aerodynamic sheet sensing means adapted to direct a jet of air across said feed path; and
   means for coupling said second aerodynamic sheet sensing means to the other control line of said fluid amplifier whereby a sensing operation of either of said aerodynamic sheet sensing means can cause said fluid amplifier to alter its mode of operation.

6. An pneumatic control means: comprising
   a fluid control device;
   said control device having first and second control lines connected thereto;
   a first air conduit line adapted to conduct a stream of air;
   aspirating means operatively disposed in said first air conduit line; and
   a second air conduit line operatively connected between said aspirating means and said first control line whereby an interference with the flow of said air stream will create a pressure change in said first control line so that the mode of operation of said fluid control device is thereby changed;
a third air conduit line adapted to conduct a second stream of air;
a second aspirating means operatively disposed in said third air conduit line; and
a fourth air conduit line operatively coupled between said second aspirating means and said second control line whereby an interference with the flow of said first or second stream of air can cause said control device to shift to a different mode of operation.

7. An aerodynamic control means: comprising
a fluid amplifier adapted to be coupled to an air pressure source;
said fluid amplifier having first and second control lines connected thereto;
a first air conduit line adapted to conduct a stream of air;
aspirating means operatively disposed in said first conduit line; and
a second air conduit line operatively connected between said aspirating means and said first control line whereby an interference in the flow of said air stream will cause a pressure changed in said first control line thereby changing the mode of operation of said fluid amplifier;
a third air conduit line adapted to conduct a second stream of air;
an aspirating means operatively disposed in said third air conduit line; and
a fourth air line operatively connected between the last mentioned aspirating means and said second control line whereby an interference with the flow of either of said air streams can cause said fluid amplifier to shift its mode of operation.

References Cited by the Examiner

UNITED STATES PATENTS 2,907,337  10/1959  Bemporad _____ 73—37.7
3,159,170  12/1964  Callan _____ 73—37.7 X M. HENSON WOOD, Jr., *Primary Examiner.*

ALLEN N. KNOWLES, *Examiner.*